United States Patent [19]

Allwine, Jr.

[11] Patent Number: 5,218,251
[45] Date of Patent: Jun. 8, 1993

[54] COMPOSITE MAGNET STEPPER MOTOR

[76] Inventor: Elmer C. Allwine, Jr., 450 Harvard Ave., No. 9-C, Santa Clara, Calif. 95051

[21] Appl. No.: 880,960

[22] Filed: May 7, 1992

Related U.S. Application Data

[63] Continuation-in-part of Ser. No. 784,207, Oct. 28, 1991.

[51] Int. Cl.$^5$ .................................. H02K 37/14
[52] U.S. Cl. .............................. 310/49 R; 310/42; 310/156
[58] Field of Search ............... 310/49 R, 156, 42, 268

[56] References Cited

U.S. PATENT DOCUMENTS

| | | | |
|---|---|---|---|
| 2,615,227 | 10/1952 | Hornik | 24/230 |
| 3,428,837 | 2/1969 | Morreale et al. | 310/49 R |
| 3,633,138 | 1/1972 | Baermann | 335/217 |
| 4,086,519 | 4/1978 | Persson | 318/254 |
| 4,274,053 | 6/1981 | Ito et al. | 324/174 |
| 4,399,595 | 8/1983 | Yoon et al. | 24/201 |
| 4,528,473 | 7/1985 | Tezuka | 310/256 |
| 4,941,236 | 7/1990 | Sherman et al. | 24/303 |

FOREIGN PATENT DOCUMENTS

| | | | |
|---|---|---|---|
| 2847203 | 5/1979 | Fed. Rep. of Germany | 310/268 |
| 52-3969 | 12/1977 | Japan | 7/2 |
| 6603196 | 9/1966 | Netherlands | 310/268 |
| 1617548 | 12/1990 | U.S.S.R. | 310/268 |

Primary Examiner—Steven L. Stephan
Assistant Examiner—Judson H. Jones
Attorney, Agent, or Firm—Skjerven, Morrill, MacPherson, Franklin & Friel

[57] ABSTRACT

The stepper motor comprises a multi-pole composite magnet which functions as a rotor, two stator members which determine the angular position of this rotor, and means for positioning the rotor and the stator members on a common axis. The composite magnet comprises two sections, each section having a plurality of projections and apertures. The projections and apertures on a first section mate with the apertures and projections, respectively, on the second section. The first and second sections are magnetized in opposite axial directions. Each stator member has a plurality of pole pieces which are positioned in operative relation to the composite magnet. In one embodiment, two windings are formed on each stator member. Applying current to one or both of these determines the polarity of the pole pieces on that stator member. In another embodiment, a stator member comprises a hollow, toroid-shaped trough. Pole fingers extend from the edges opposite the edges defining the bottom of the trough. Two windings are placed in the trough and the pole fringes are then bent to secure these windings and complete the electromagnetic circuit.

11 Claims, 14 Drawing Sheets

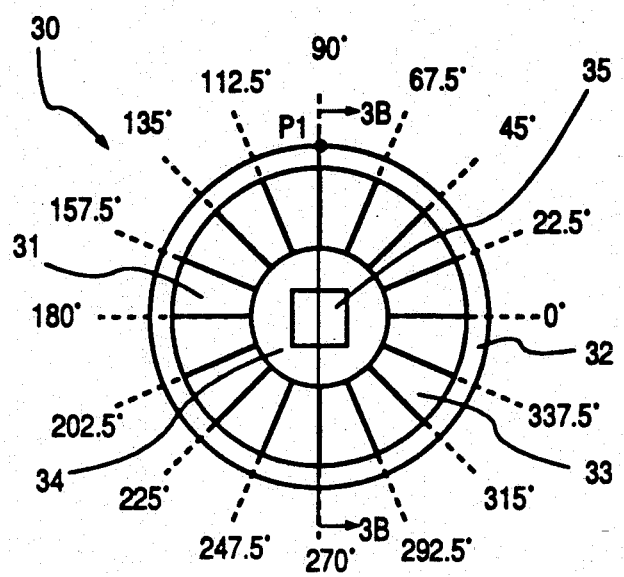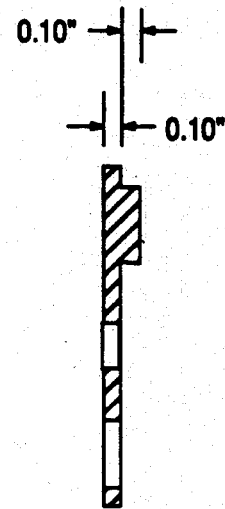
Fig. 3A
Fig. 3B
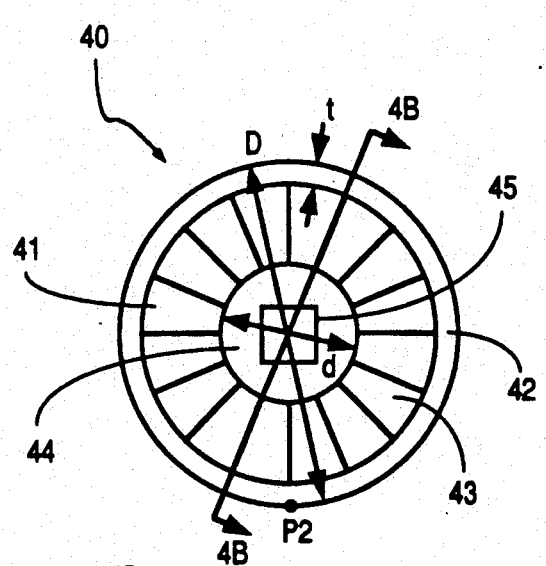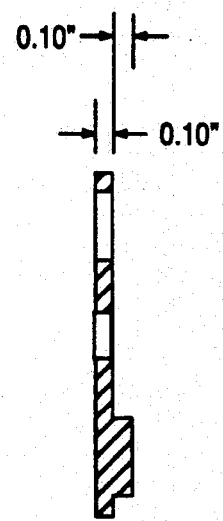
Fig. 4A
Fig. 4B

PHASE A

PHASE B

COMPOSITE MAGNET STEPPER MOTOR

CROSS REFERENCE TO RELATED APPLICATION

This is a continuation in part of the parent application Ser. No. 07/784,207, entitled, "Multi-Pole Composite Magnet Used In A Magnetic Encoder, filed by Elmer C. Allwine, Jr. on Oct. 28, 1991.

BACKGROUND OF THE INVENTION

1. Field of the Invention

This invention relates to stepper motors, and in particular to a stepper motor which uses a composite magnet.

2. Description of Related Art

U S. Pat. No. 4,207,483, issued to Baer, discloses an electric stepper motor using a rotor having embedded permanent magnets which are polarized in an axial direction. Energizing one of two coils associated with two stator members causes the rotor to move one detent position.

One major drawback in this motor is the difficulty in manufacturing of the rotor. Baer teaches that twelve permanent magnet regions are equally spaced around the circumference of a ceramic ring which is affixed to the hub of the motor. For optimal performance, the centers of the permanent magnet regions are located at the same radial position from the motor axis as the radial centers of the stator pole teeth. For these conditions to be met, precise tooling of all twelve permanent magnet regions, as well as the ceramic ring, is required. Moreover, assembly of the permanent magnet regions into the ceramic ring is time and labor intensive.

Therefore, a need arises for a stepper motor having a rotor which provides ease of manufacture at a reasonable cost.

SUMMARY OF THE INVENTION

In accordance with the present invention, a stepper motor is compact, easily manufactured, and provides high torque. The stepper motor comprises a multi-pole composite magnet which functions as a rotor, two stator members which determine the angular position of this rotor, and means for positioning the rotor and the stator members on a common axis.

The composite magnet comprises two sections, each section having a plurality of projections and apertures. The projections and apertures on a first section mate with the apertures and projections, respectively, on the second section. The first and second sections are magnetized in opposite axial directions which results in two advantages. First, the composite magnet provides a high area of energy conversion per unit volume, thereby significantly reducing the size of the stepper motor in comparison to prior art stepper motors. Second, because the projections and apertures are magnetized in opposite axial directions, the magnetic poles are extremely well-defined thereby ensuring that accuracy and high torque capability are provided.

Each stator member has a plurality of pole pieces which are positioned in operative relation to the composite magnet. In one embodiment, two windings are formed on each stator member. Applying current to one or both of these determines the polarity of the pole pieces on that stator member.

In another embodiment, a stator member comprises a hollow, toroid-shaped trough. Pole fingers extend from the edges opposite the edges defining the bottom of the trough. Two windings are placed in the trough and the pole fingers are then bent to secure these windings and complete the electromagnetic circuit.

BRIEF DESCRIPTION OF THE DRAWINGS

FIGS. 3A and 3B illustrate an embodiment of the present invention for a stepper motor in which one-half of the composite magnet comprises both projections and apertures.

FIGS. 4A and 4B show the complementary half of the composite magnet shown in FIGS. 3A and 3B.

DETAILED DESCRIPTION OF THE DRAWINGS

In accordance with the present invention, a rotor for a stepping motor comprises two pieces of permanent magnetic material formed with protrusions and/or apertures which facilitate joining of the two pieces. The two pieces are magnetized in opposite axial directions. In this manner, the two pieces, when joined together, form a composite magnet, thereby significantly reducing manufacturing expense and, additionally, providing the advantage of well-defined north-south poles.

Figure 1A:
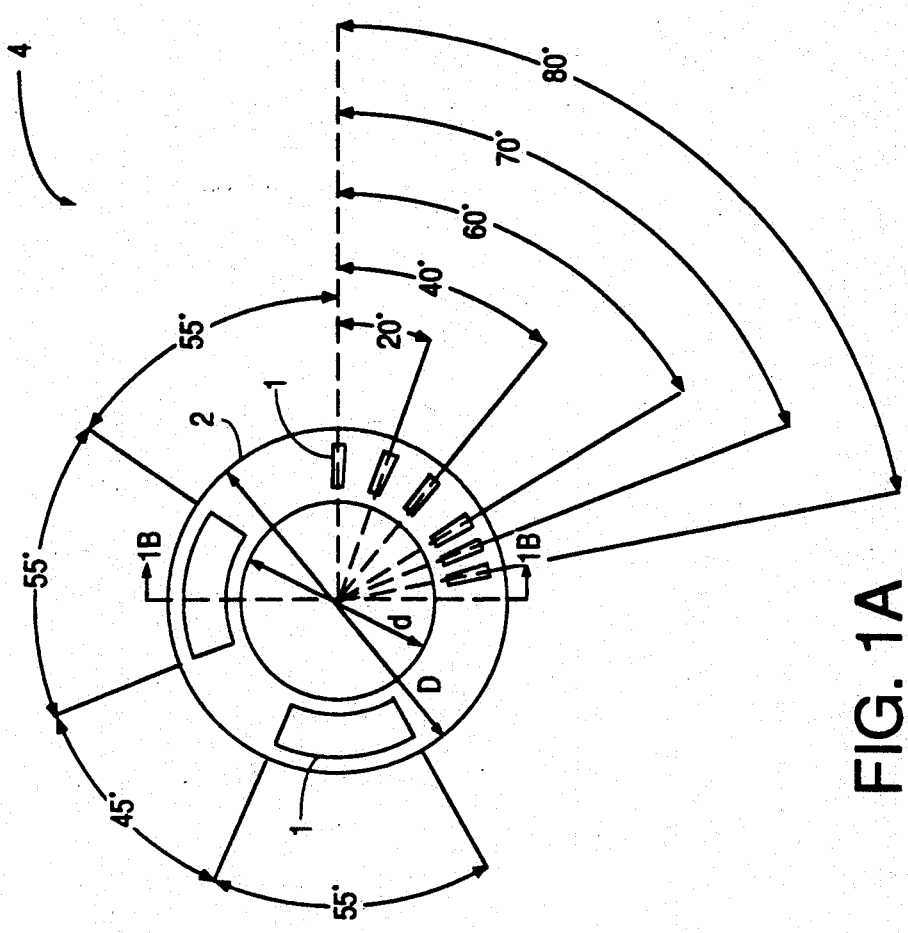
FIGS. 1A and 1B illustrate one-half of the composite magnet having projections on its surface.
Figure 1B:
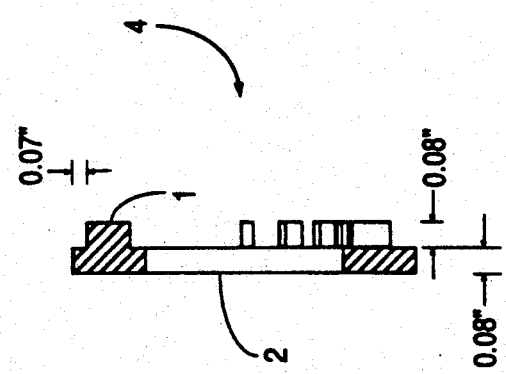
Figure 2A:
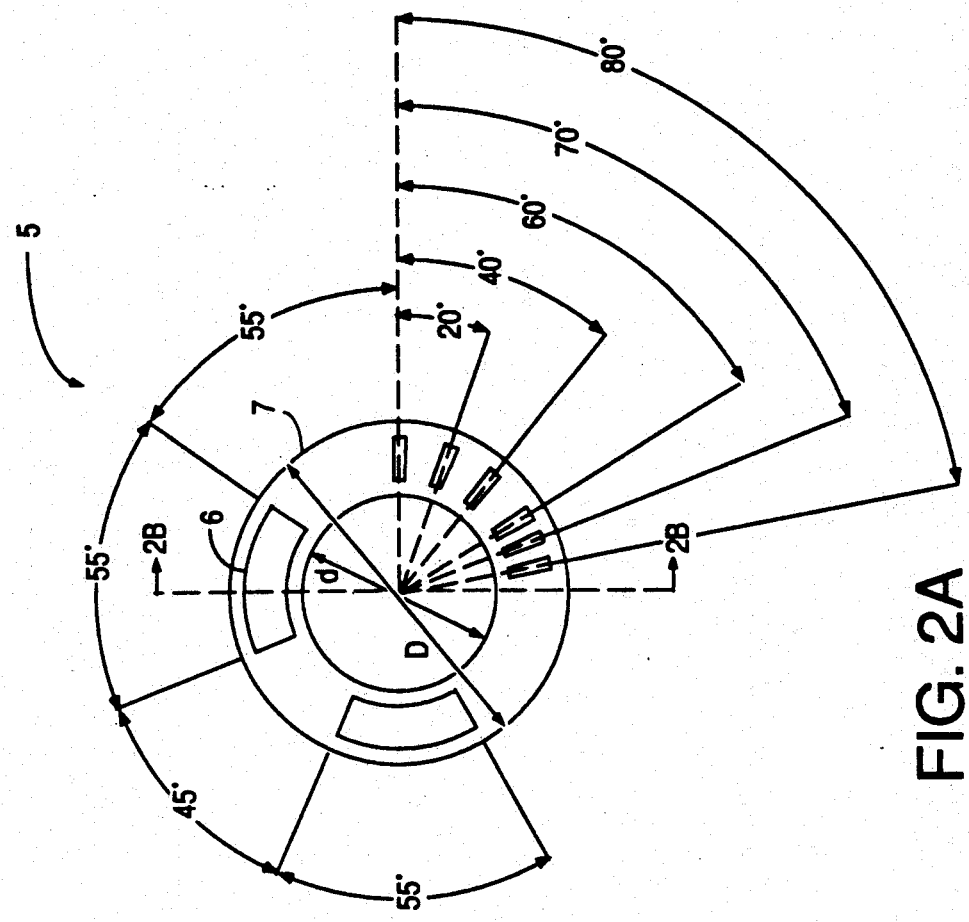
FIGS. 2A and 2B show the complementary half of the composite magnet shown in FIGS. 1A and 1B which has apertures in its surface.
Figure 2B:
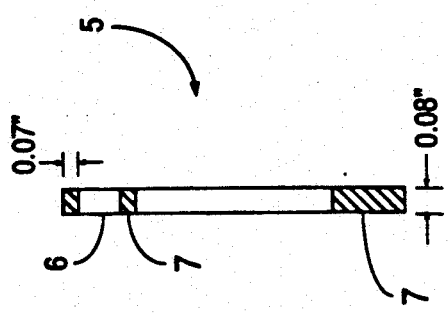

FIGS. 1 and 2 illustrate one embodiment of a composite magnet in which each piece of the composite magnet either has projections or apertures. FIG. 1A illustrates a planar view of a magnet 4 which has protrusions 1 formed integrally with a structural member 2. FIG. 1B shows a cross-section of magnet 4 shown in FIG. 1. FIG. 2A illustrates in planar view the complementary piece of magnet 4 shown in FIG. 1A and 1B, magnet 5. Magnet 5, in contrast to magnet 4, has apertures 6 which extend through a structural member 7. FIG. 2B shows a cross-section of magnet 5.

Each projection 1 found on magnet 4 shown in FIG. 1 matches an aperture 6 formed on magnet 5 shown in FIG. 2. Hence, to join magnet 4 with magnet 5, each protrusion i mates with its corresponding aperture 6. Because each half of the composite magnet, magnet 4 or magnet 5, is magnetized in an opposite axial direction to the other half (as will be described later in reference to FIG. 5), complete saturation is possible, i.e. a particular pole is homogeneously established at a particular strength throughout the whole member.

In some prior art rotors, a lack of well-defined north-south poles occurs because of the "Block wall" effect. A "Block wall" effect typically occurs if a north and south pole are provided on the same piece of material. When a "Block wall" occurs, the transition from one polarity to another is accompanied by a decrease in the magnetic field and a gradual switching from north to south and from south to north poles. In other words, a finite distance through the material is required to complete the transition from one pole to another. Generally, the distance associated with the polarity switch is too large to constitute well-defined poles. Moreover, because magnets are typically formed from ferrite particles which are of varying sizes, in addition to impurities present in manufacturing, the transition distance may actually vary, thereby further worsening pole definition. Ill-defined poles in a rotor cause highly undesirable angular positioning inaccuracies.

In contrast, a composite magnet in accordance with the present invention has poles which are formed in different pieces of material. In this manner, irrespective of the homogeneity of the material comprising the magnet or impurities present in manufacturing, the transition distance between poles is geometrically fixed. Specifically, when magnet 4 is joined to magnet 5, the transition region from north to south poles, and vice versa (described above as the "Bloch wall" effect) is virtually eliminated, thereby providing extremely well-defined poles.

Projections 1 have the same depth as apertures 6. Hence, when magnet 4 and magnet 5 are joined, the outer surface of the composite magnet is flush. In this manner, the present invention solves the problem of mechanical alignment experienced in the prior art, thereby expanding possible applications for the composite magnet.

FIGS. 3 and 4 illustrate one embodiment of a composite magnet for a stepper motor, wherein the composite magnet includes two pieces each having projections and apertures. FIG. 3A shows a top view of one-half of the composite magnet in accordance with the present invention. In FIG. 3A, magnet 30 has protrusions 31, structural members 32 and 34 (outer and inner, respectively), apertures 33, and shaft hole 35. FIG. 3B shows magnet 30 in cross-section.

FIG. 4A illustrates magnet 40, the complementary (and identical) half to magnet 30. Magnet 40, as seen in FIG. 4A, comprises projections 41, structural members 42 and 44 (outer and inner, respectively), apertures 43, and shaft hole 45. FIG. 4B shows magnet 40 in cross-section. In this embodiment, magnets 30 and 40 have an inner diameter d of 0.70 inches (1.78 cm) and an outer diameter D of 1.40 inches (3.56 cm). The angular width of outer member 32 is 0.05 inches (0.13 cm). whereas the thickness of this member is 0.10 inches (0.254 cm). The thickness of each protrusion 33/43 is 0.10 inches (0.254 cm), while each aperture 31/41 is 0.10 inches (0.254 cm) deep. The angular distance from any edge on protrusions 33/43 to an adjacent protrusion edge is 22.5°. Note all measurements are approximate and refer to only one embodiment of the present invention.

Magnet 30 mates with magnet 40 to form the composite magnet. For example, magnets 30 and 40 are joined such that point P1 on magnet 30 and point p2 on magnet 40 are adjacent, and projections 31 fit in apertures 43. As mentioned previously, because projections 31 have a height equal to the depth of apertures 43, the resulting composite magnet has a flush outer surface having a thickness of 0.2 inches (0.508 cm).

Figure 5:
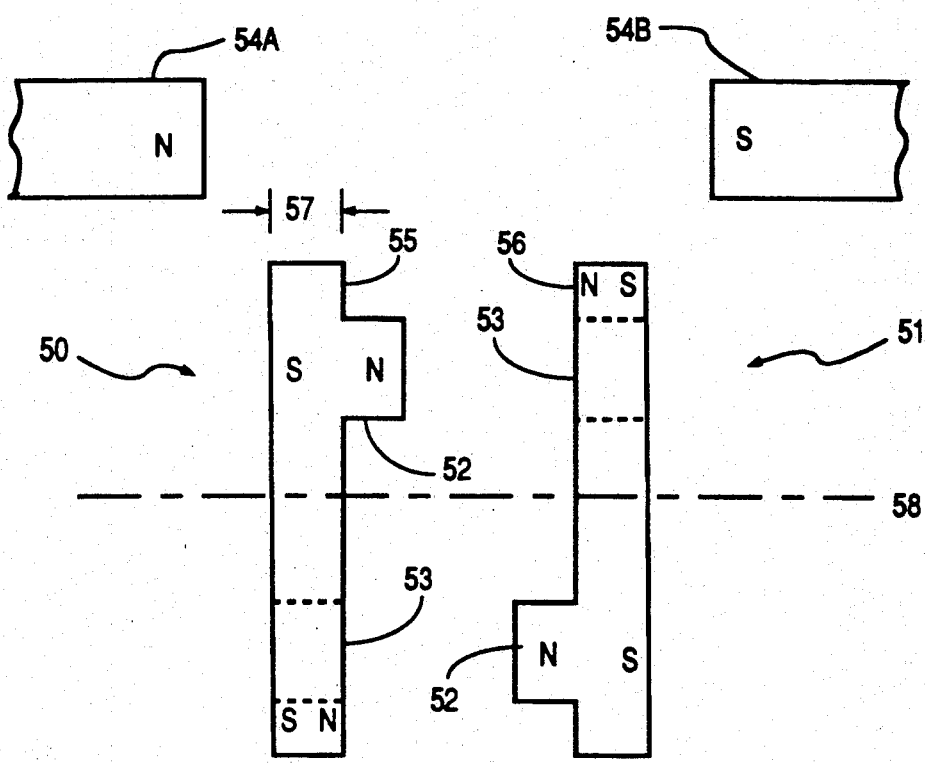
FIG. 5 shows one magnetizing process for composite magnet pieces in accordance with the present invention.

The magnetizing of the two halves of the composite magnet, such as magnets 30 and 40, is shown in FIG. 5. North and south poles are established on members 50 and 51 using conventional methods, such as magnetizing by two pole pieces 54A and 54B (north and south, respectively). This method is extremely simple and cost effective. Note that members 50 and 51 may be physically magnetized at the same time by positioning either member 50 or 51 on its opposite side, thereby lining up the poles in one direction. Because members 50 and 51 are magnetized in opposite axial directions, i.e. for purposes of joining the two members, when member (now magnet) 50 nears member (now magnet) 51 there is an initial repulsion due to the fact that the respective north poles of each magnet are getting closer.

However, once a projection 52 is introduced into an aperture 53, the attraction between the north and the south poles of the other magnet draws magnets 50 and 51 together. Because of the configuration of mating pieces 50 and 51, a slight repulsion exists between surface 55 of magnet 50 and surface 56 of magnet 51. Although the attractive forces mentioned above are much greater than these repulsive forces, a fast-setting bonding agent may be used on the mating surfaces of magnets 50 and 51 to ensure no gaps are formed after joining of the two magnets.

The strong bond between magnets 50 and 51 forms the composite magnet. In this manner, the composite magnet acts as a single permanent magnet exhibiting a magnetic pattern of north-south poles matching the pattern of projections and apertures. Note that the above-described method of magnetizing results in axial north-south poles, i.e. the poles are positioned about axis 58, not radially spreading from a common center.

The size of the protrusions and apertures of the composite magnet as illustrated in FIGS. 1–4 varies, depending on the particular application for which the composite magnet is used. Manufacturing of the complementary halves of the composite magnet is accomplished using conventional machining or injection molding processes (which significantly reduces manufacturing cost). Preferred materials for making the composite magnet include, but are not limited to: barium ferrite in plastic form, for example 3M Brand Magnet Material B1060-B1062; for higher energy product, neodymium boron in plastic form, sold by Tengam under the trade-name "NeoComp"; rare-earth materials, such as samarium cobalt, if expense warrants their usage; or any moldable ceramic grades of material.

Because the composite magnet is typically formed from a mold which is very accurately machined, the angular positioning of the north and south poles is virtually perfect. Also, the region between any north and south pole, is very narrow (approximately ½ degree), and located along a very accurate radial line. This narrow region ensures the composite magnet will exhibit an extremely rapid transition between any north-to-south pole or any south-to-north pole. This high rate of change in magnetic polarity (generally described in the art as $d\phi/d\phi$) being very accurately located with respect to any angular line results in a very small angular positioning error.

A stepper motor is generally used in an "open-loop" digitally controlled positioning system which provides no feedback to determine an absolute position of the rotor. Therefore, minimizing error in the "step" of the stepper motor, i.e. the position of the rotor, is highly desirable. In accordance with the present invention, the composite magnet significantly reduces positioning error by providing an extremely high rate of change in magnetic polarity.

Additionally, in many conventional stepper motors, the magnetic field is established around the outer circumference of a long cylinder. In contrast, in the present invention the magnetic field of the composite magnet (described in detail later) emanates from both sides of a relatively thin disc, thereby dramatically altering the geometry of the energy conversion space. Specifically, while a conventional stepper motor has a radial magnetic field applying force to radially-oriented electromagnetic poles, the present invention has an axial magnetic field applying force to axially-oriented electromagnetic poles. Thus, the composite magnet can significantly increase the area for energy conversion per unit volume. For example, it is well known that the surface area of a cylinder for a typical prior art rotor is equal to $2\pi r h_1$ and the surface area of two circular surfaces of the composite magnet in accordance with the present invention is $2\pi r^2$ (where r is the radius of both the cylinder and the composite magnet and $h_1$ is the height of the cylinder). It logically follows that for the surface areas, i.e. the areas available for the purpose of energy conversion, of the cylinder and the composite magnet to be equal, the height $h_1$ of the cylinder must equal the radius r of the composite magnet. Note the volume of the cylinder is represented by $\pi r^2 h_1$, whereas the volume of the composite magnet is represented by $\pi r^2 h_2$ (where $h_2$ is the thickness of the composite magnet). Thus, the following ratio is derived:

$$\frac{\text{Volume of composite magnet}}{\text{Volume of cylinder}} = \frac{\pi r^2 h_2}{\pi r^2 h_1} = \frac{h_2}{h_1}$$

In typical applications, the thickness $h_2$ of the composite magnet is 0.2 inches, whereas the height $h_1$ of the cylinder is 1 inch. Using the illustrative measurements above, a ratio of 1 to 5 is derived. This means that for equal surface areas available for energy conversion the composite magnet is at least five times smaller in volume.

Thus, for equal surface areas, i.e. effective energy conversion areas, a rotor comprising a composite magnet, in comparison to a conventional rotor comprising a cylinder, provides a more effective use of volume in a stepper motor. Therefore, to provide a given torque, the volume of a stepping motor in accordance with the present invention can be considerably reduced when compared to the prior art. Indeed, the present invention results in a more densely concentrated energy conversion volume where the permanent magnet flux density interacts with the electromagnetic poles. Hence, a higher torque output per unit volume is provided.

Moreover, it is also well known in the art that the moment of inertia of a cylinder is equal to $\frac{1}{2}mr^2$, where m is the mass which is equal to the density of the material times the volume. Therefore, assuming similar materials are used for both the cylindrical rotor and for the composite magnet, the composite magnet provides a lower moment of inertia than the prior art rotor, and thus a higher stepping rate results.

Figure 6:
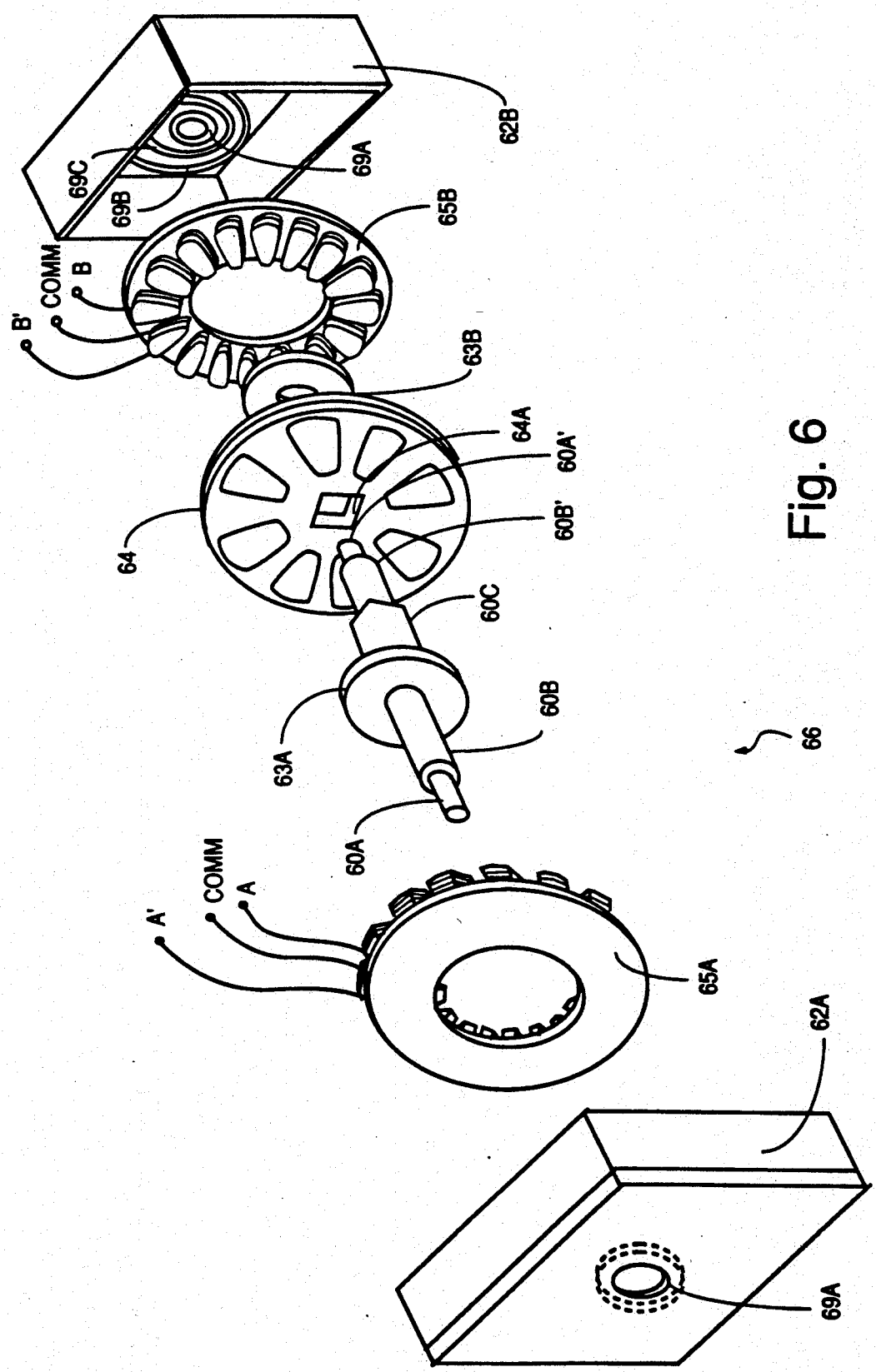
FIG. 6 illustrates an exploded perspective view of the composite magnet stepping motor in accordance with the present invention.

FIG. 6 illustrates a stepper motor 66 in accordance with the present invention which includes a composite magnet 64. In FIG. 6, the motor shaft 60 in one embodiment comprises three sections. Section 60C supports and secures composite magnet 64 which functions as a rotor. In this embodiment, composite magnet 64 includes a hole 64A in its center which mates identically with section 60C (a ¼ inch square member) of shaft 60. The square hole in composite magnet 64 and the shaft section 60C in combination prevent any slippage on shaft 60. Other shapes for hole 64A and shaft section 60C may be used to prevent angular slippage of composite magnet 64 on shaft 60. Sections 60B and 60B' secure left and right spacers 63A and 63B, respectively, which will be described in detail later.

Figure 7:
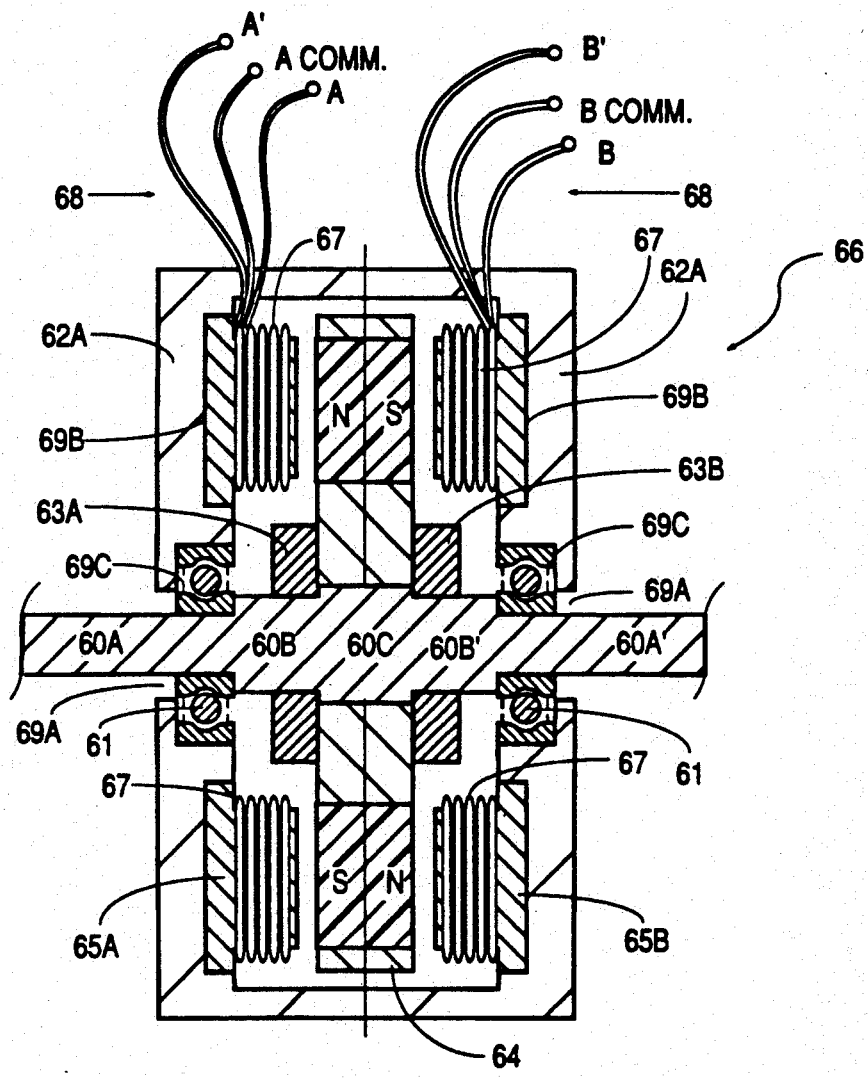
FIG. 7 shows a cross-section of the composite magnet stepping motor shown in FIG. 6.

Sections 60A and 60A' are centered in holes 69A in motor housing members 62A and 62B, respectively, and supported by bearings 61 (FIG. 7). Bearings 61 provide a low friction interface between shaft 60 which rotates and motor housing 62A/62B which is stationary. Sections 60A, 60B, 60C, 60A', 60B', and 60C' are typically formed integrally, thereby providing a strong shaft for high torque conditions. Shaft 60 is generally constructed of a non-magnetic material, such as aluminum or stainless steel. Motor housing members 62A and 62B, also made from non-magnetic material, secure stator members 65A and 65B with annular indentations 69B. Annular indentation 69C, also formed in housing member 62A and 62B, hold bearings 61.

Left spacer 63A, which is press-fitted onto shaft 60B, provides a flat surface against one face of composite magnet 64. Right spacer 63B, fitted on shaft section 60B', provides a flat surface against the other face of composite magnet 64. Thus, composite magnet 64 is sandwiched between left spacer 63A and right spacer 63B. Because left spacer 63A and right spacer 63B form planes that are perpendicular to shaft 60, left spacer 63A and right spacer 63B eliminate any axial wobble of composite magnet 64 that would otherwise occur. Both left and right spacers 63A and 63B are formed from non-magnetic material.

Note that the number of members shown in FIG. 6 is significantly reduced from that in the prior art (see, for example, Baer 4,207,483). Therefore, the cost of manufacture of a stepper motor in accordance with the present invention is lower than in the prior art. Additionally, these members are easily tooled and assembled, thereby further reducing the cost to manufacture a stepper motor.

However, as mentioned previously in regard to the area of energy conversion per unit volume, the power of the composite magnet used as a rotor in the stepping motor is typically greater than that provided by prior art stepper motors of equal size. Therefore, the cost per unit power is less than a conventional stepper motor.

FIG. 7 illustrates stepper motor 66 of FIG. 6 in cross-section. Pole pieces 67 are formed on stator members 65A and 65B. Phase windings 68, wound around the pole pieces 67, form electromagnets which, depending upon the current flow through phase windings 68 (described in detail below), create an apparent north or south pole at any given pole piece 67 surface adjacent to composite magnet 64.

Figure 8:
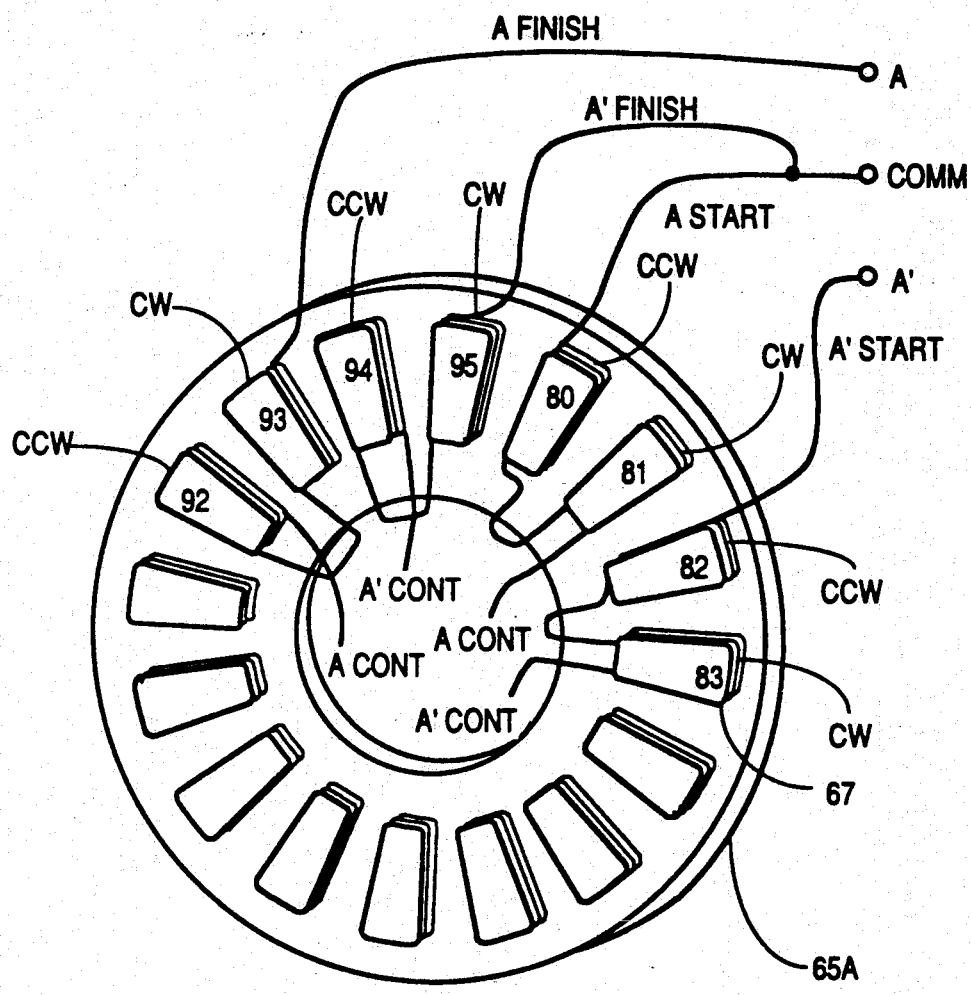
FIG. 8 shows a partial prospective of the windings on one stator plate.

Each stator member 65A or 65B has two phases formed by coils wound on pole pieces 67. As illustrated in FIG. 7, stator member 65A includes phase A and phase A', whereas stator member 65B includes phase B and phase B' FIG. 8 shows a partial, perspective view of phases A and A' on stator member 65A. Phase A starts at common node COMM, then begins a counter-clockwise winding around pole piece 80, followed by a clockwise winding around pole piece 81. Pole pieces 82 and 83 are skipped, then pole pieces 84 and 85 (shown in FIG. 9A) are wound counter-clockwise and clockwise, respectively. This winding pattern continues around stator member 65A until the last pair of pole pieces associated with phase A, in this case pole pieces 92 and 93, are wound. The finish of phase A is left floating.

Phase A' starts at pole piece 82 with a counter-clockwise winding and a clockwise winding around pole piece 83. Pole pieces 84 and 85 (shown in FIG. 9A) are skipped, then pole pieces 86 and 87 (also shown in FIG. 9A) are wound counter-clockwise and clockwise, respectively. This winding pattern continues until the last pair of pole pieces associated with phase A', pole pieces 94 and 95, are wound. The finish of phase A' is connected to the common node COMM. Thus, phase A is wound around every other pair of pole pieces on stator member 65A. Phase A' is also wound around every other pair of pole pieces, thereby balancing the torque produced by the pole pieces on stator member 65A.

Figure 9A:
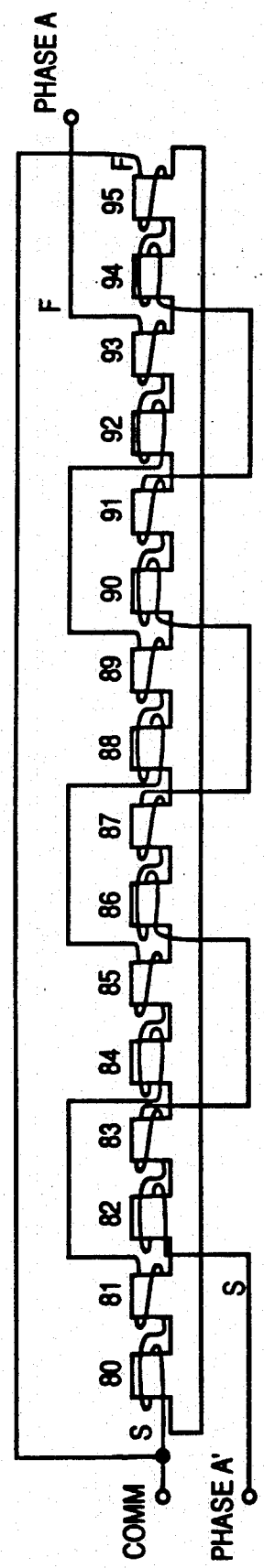
FIG. 9A shows a diagram of a linear view of the windings illustrated in FIG. 8.
Figure 9B:
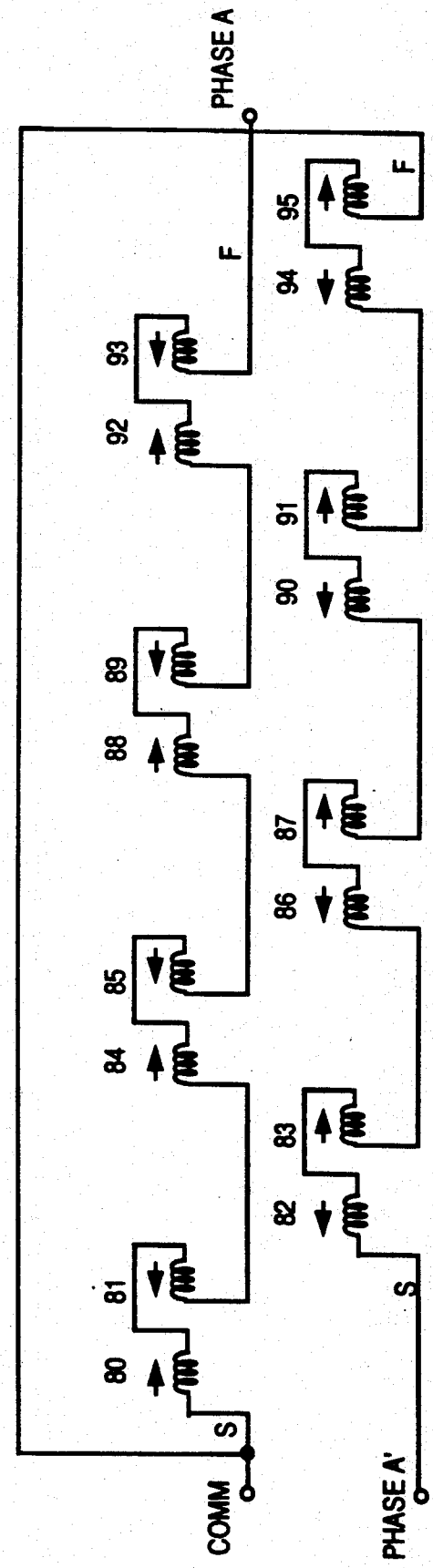
FIG. 9B illustrates that each pair of coils has current flowing in opposite directions, thereby providing opposite polarities in the pole pieces.

FIG. 9A illustrates an unwrapped linear view of phase A and phase A' windings on stator member 65A. All sixteen pole pieces 80-95 are shown. Additionally, the start S and finish F of phase A and A' are shown (see also FIG. 8). FIG. 9B illustrates that because the coils for each pair of pole pieces are wound in opposite directions the currents flowing through the coils oppose each other. This difference in current flow produces opposite polarities in the pole pieces. Thus, referring back to FIG. 9A, if current flows through phase A and pole piece 80 as a result of this current flow has a north polarity, pole piece 81 has a south polarity. Pole pieces 82 and 83 have north and south polarities, respectively, because of the permanent polarities of the adjacent composite magnet (seen more clearly in FIG. 10). Note that the finish F of phase A' is connected to the common node COMM, which is then coupled to a voltage supply of, for example, twelve (12) volts. In this manner, when phase A' is activated, current flows through phase A' in the opposite direction, thereby producing polarities on the pole pieces opposite to those produced by phase A activation.

In one embodiment, phases A, A', B, and B' are constructed from 36 AWG wire having a diameter of 0.006 inches (0.0152 cm), and a resistance of approximately 0.415 Ohms/foot (0.0136 Ohms/cm). The length of wire for one complete turn around a pole piece (i.e. a coil) is approximately 0.9 inches (2.286 cm). The number of turns for one pole piece is, for example, 100. Thus, the length of wire required for one pole piece is about 90 inches (228.6 cm). In this embodiment of the present invention, eight pole pieces must be wound for each phase. Therefore, each phase has a wire length of 720 inches (1828.8 cm), which provides a resistance of 24.9 Ohms (0.415 Ohms/ft × 1 foot/12 inches × 720 inches).

Figure 10:
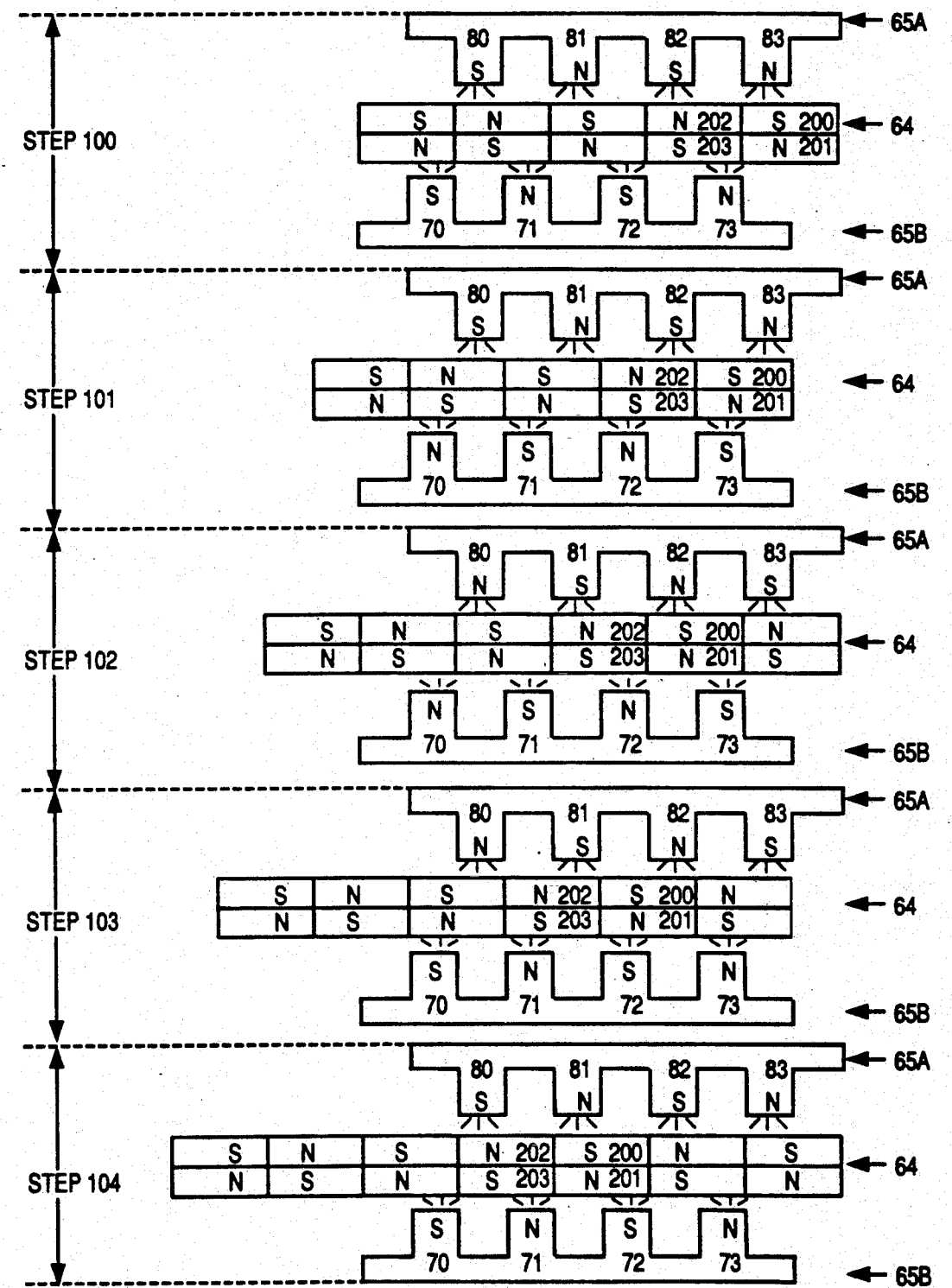
FIG. 10 shows schematically the full stepping sequence in the present invention.

FIG. 10 illustrates a linear, schematic representation of pole pieces on stator members 65A and 65B in relation to the permanent north/south poles on composite magnet 64. For simplicity, only four pole pieces are shown on each stator member. Stator member 65A and stator member 65B are positioned relative to one another such that a pole piece on stator member 65A is angularly displaced from another pole piece on stator member 65B by ¼ pole pitch, i.e. 90 magnetic degrees.

In step 100, composite magnet 64 is in its rest position. In this position, south pole 200 on composite magnet 64 is attracted to pole piece 83 on stator member 65A which exhibits a north pole. Similarly, north pole 202 is attracted to pole piece 82. Simultaneously, north pole 202 is repelled by pole piece 83 because of its north face. Similar attraction and repelling forces are present because of stator member 65B.

In step 101, the polarity of pole pieces 80-83 remains the same while the polarity of pole pieces 70-73 on stator member 65B has been switched. For example, pole piece 73 in step 100 exhibited a north pole, whereas in step 101 pole piece 73 exhibits a south pole. Thus, the previous attraction of south pole 203 to pole piece 73 turns to a repulsion, and the previous repulsion of south pole 203 to pole piece 72 turns to attraction. In this manner, composite magnet 64 is shifted through a ¼ pole-pitch in one angular direction. This ¼ pole-pitch corresponds to an approximately 11.25 degree angular turn in composite magnet 64.

In step 102, the polarity of pole pieces 70-73 remains the same as in step 101, but the polarity of pole pieces 80-83 switches. This switch results in south pole 200 now being attracted to pole piece 82 which is exhibiting a north pole, and being repulsed by pole piece 83 which is exhibiting a south pole. Thus, composite magnet 64 is shifted another ¼ pole pitch in the same angular direction.

Composite magnet 64 is subsequently moved through another ¼ pole pitch by reversing the polarity of the pole pieces on stator member 65B, as shown in FIG. 10. In step 104, composite magnet 64 is further moved another pole pitch in the same angular direction by reversing the polarities on pole pieces 65A. Therefore, in reference to step 100, composite magnet 64 completes a full pole pitch, i.e. 360 magnetic degrees in step 104.

In accordance with the present invention, composite magnet 64 remains at a detent position, i.e. at any position indicated in steps 100-104, irrespective of whether current is flowing. In particular, if a power outage occurs, the magnetic forces of the polarities on composite magnet 64 on the pole pieces maintain composite magnet 64 in its last detent position. Note that when neither stator member 65A nor 65B is activated, the polarities established on the pole pieces are a result of the influence of the permanent poles on composite magnet 64. In this manner, when power is restored, the stepper motor simply starts at this last detent position.

Reversing polarities of the pole pieces is accomplished, in one embodiment, by providing current in a complementary phase. For example, referring to FIG. 8, if current is provided to phase A, polarities are reversed by instead providing current to phase A'. Thus, for this embodiment, only one phase from each stator member during each step or detent is activated to operate the stepper motor. A summary of possible phases is shown below in Table 1 in which "0" means that no current is provided and "1" means current is provided.

TABLE 1

| Step | A | A' | B | B' |
|------|---|----|---|----|
| 101 | 1 | 0 | 0 | 1 |
| 102 | 0 | 1 | 0 | 1 |
| 103 | 0 | 1 | 1 | 0 |
| 104 | 1 | 0 | 1 | 0 |

Progressing from step 101 to step 104 moves the composite magnet in one angular direction while progressing from step 104 to step 101 moves the composite magnet in the opposite angular direction.

Figure 11:
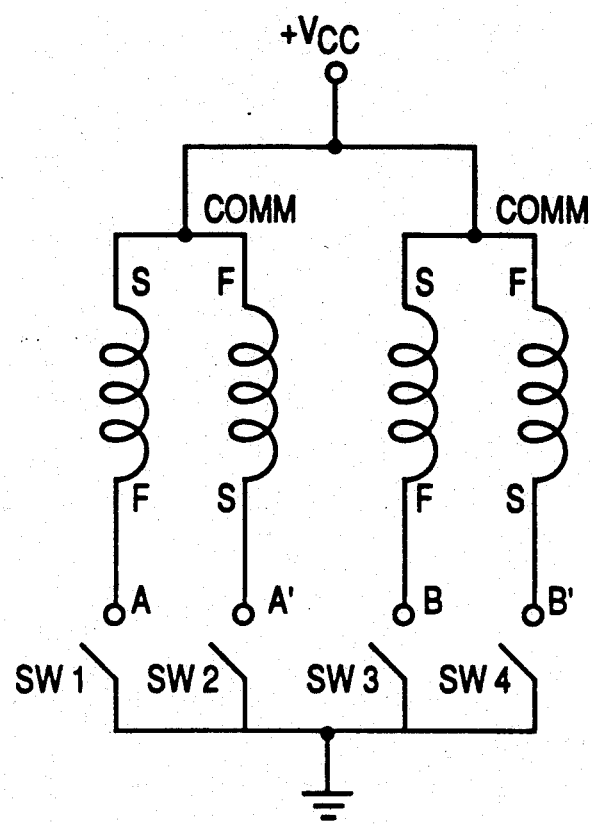
FIG. 11 illustrates a unipolar drive connection in accordance with the present invention.

A typical unipolar drive connection to accomplish this reversal of polarities is illustrated in FIG. 11. In FIG. 11, four switches, SW1, SW2, SW3, and SW4, are selectively connected to phases A, A', B, and B', respectively. Each phase has start S or finish F connected to common node COMM. Common node COMM is coupled to a voltage source Vcc which typically may be 5, 12, or 24 volts. Each switch is connected to ground. Closing a switch provides a current through the phase associated with that switch. For example, if switches SW2 and SW3 are closed, current is provided to phases A' and B. Note this condition corresponds to step 103 as shown above in Table 1.

Figure 12:
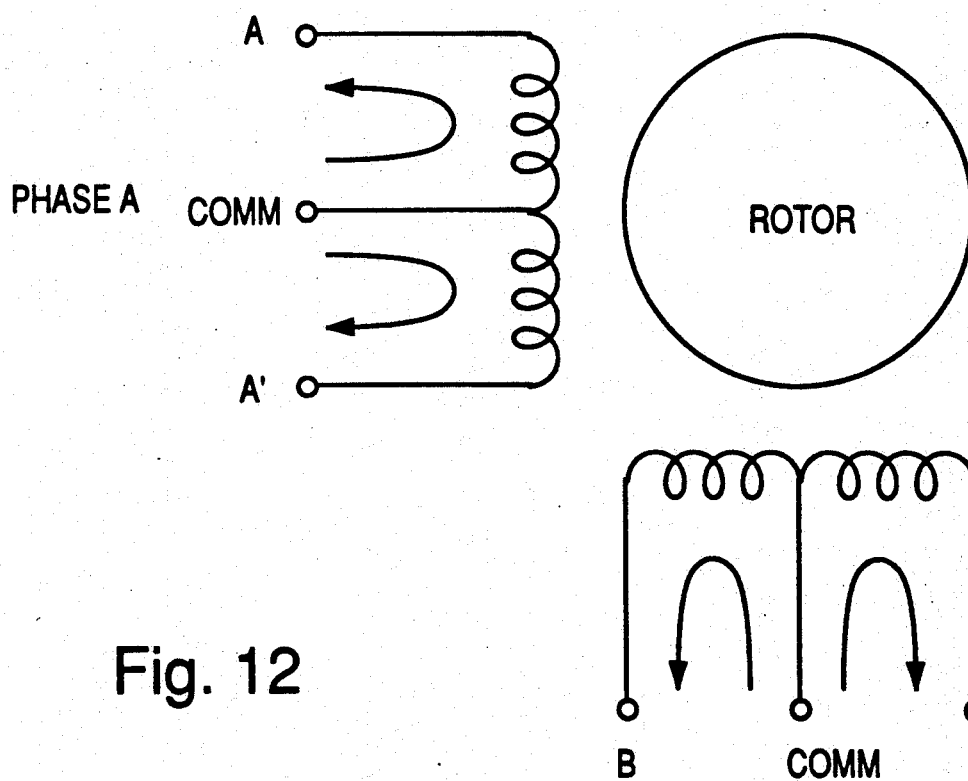
FIG. 12 illustrates that the two phases on one stator member are positioned at 90° magnetically from the two phases on the other stator member.

In this embodiment of the present invention, phases A and A' are positioned at 90° magnetically from phases B and B' as shown schematically in FIG. 12. In this configuration, three options for driving stator members 65a and 65B are possible. First, referring to FIG. 11, the stator members can be driven in a unipolar manner by closing one switch, thereby connecting the resistance associated with a particular phase to ground. This connection generates a current from the voltage source Vcc through the resistance. Second, phases B and B', for example, are connected in series to an H-bridge (not shown) with common node COMM between the two phases. In this manner, if phase B is connected to voltage source Vcc, phase B' is simultaneously connected to ground. Thus, the resistance of the system is twice that of the unipolar connection of FIG. 11, thereby effectively reducing the current by one-half. Finally, phases B and B' are connected in parallel to an H-bridge (also not shown). In this configuration, the resistance of the system is one-half of that in the unipolar configuration, thereby doubling the current. Because all drive connections are well known by those skilled in the art, no further detail on the operation of these connections is provided.

Figure 13:
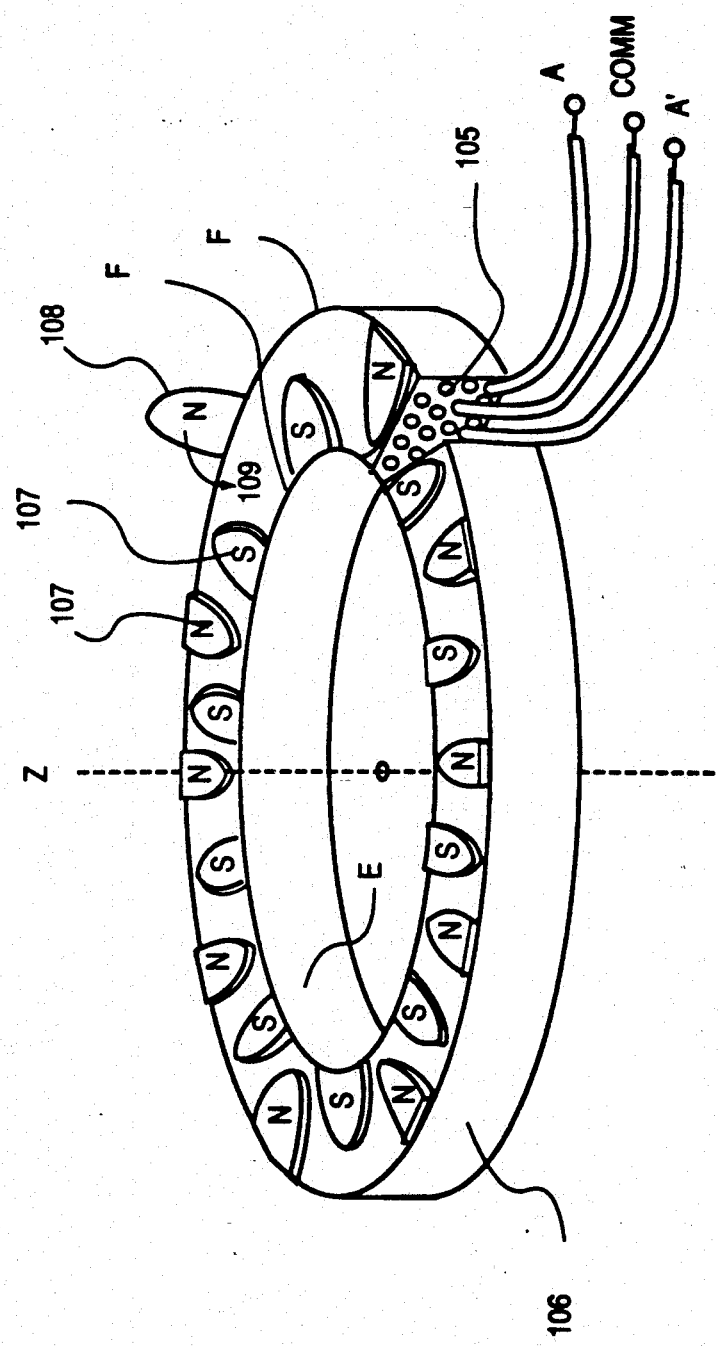
FIG. 13 shows another embodiment of the stator winding assembly in accordance with the present invention.

FIG. 13 illustrates an alternate stator winding assembly in which windings 105 (comprising, in this example, phases A and A' and common node COMM) are wound circumferentially and are placed inside of a hollow, toroid-shaped (i.e. donut-shaped) trough 106. Trough 106 is typically formed out of a material which has high permeability, and is highly magnetic and ductile in nature. This assembly is geometrically distinguished from a can stack or a clawed pole stepper motor (which have fingers on the inside ring E to cause movement of a cylinder placed along the Z-axis) by including fingers 107 on edges F of trough 106. Fingers 107 are then bent down into the position shown (see, for example, finger 108 which is bent in direction 109), thereby enclosing windings 105 and eventually forming alternate north-south poles around a plane in the z-axis. These poles are usually referred to as "hetero-poles". The magnetic polarity is determined by the direction of current flow in windings 105.

Figure 14:
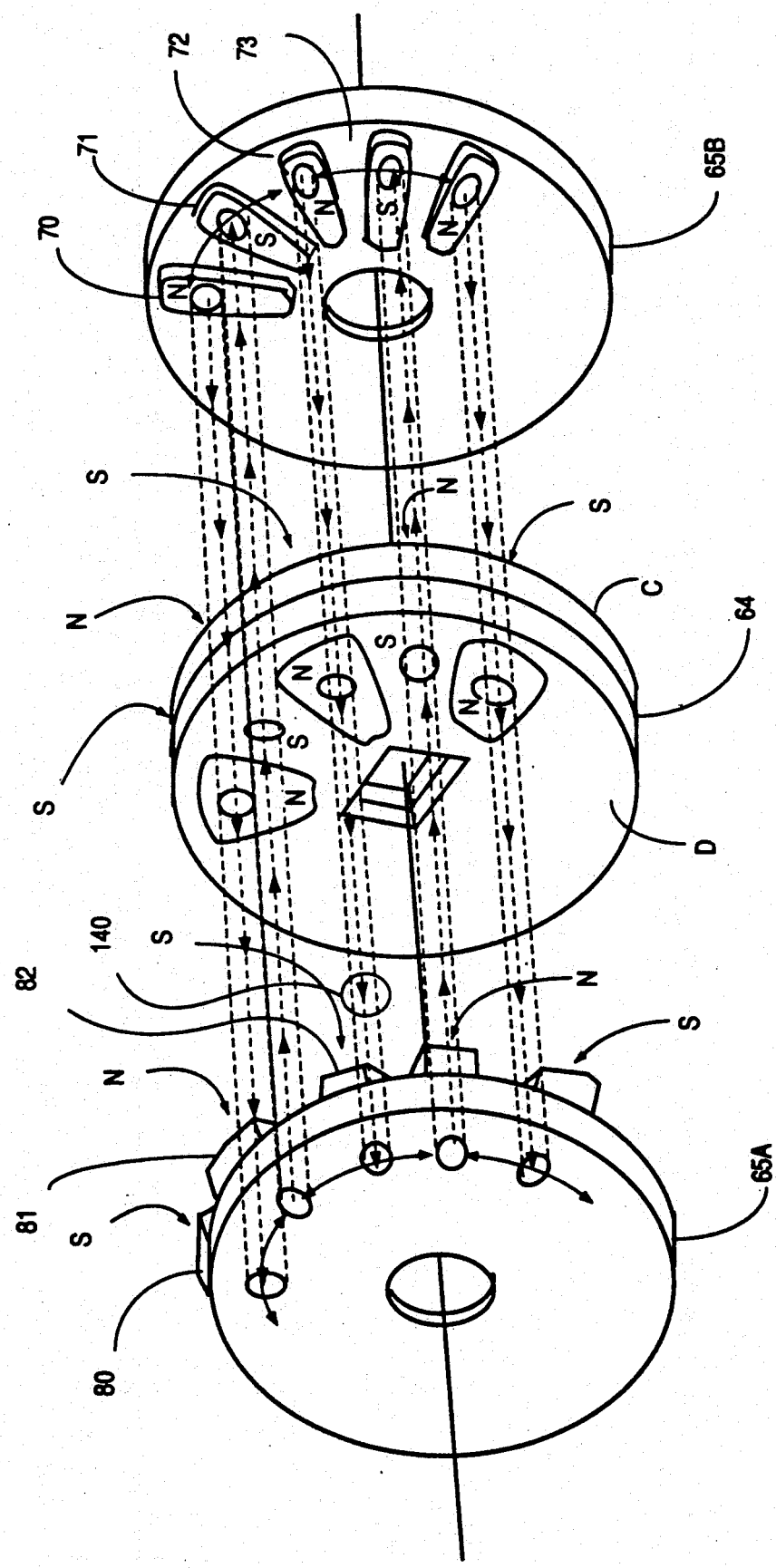
FIG. 14 shows an exploded perspective view of the composite magnet and two stator members with four flux loops illustrated schematically.
Figure 15:
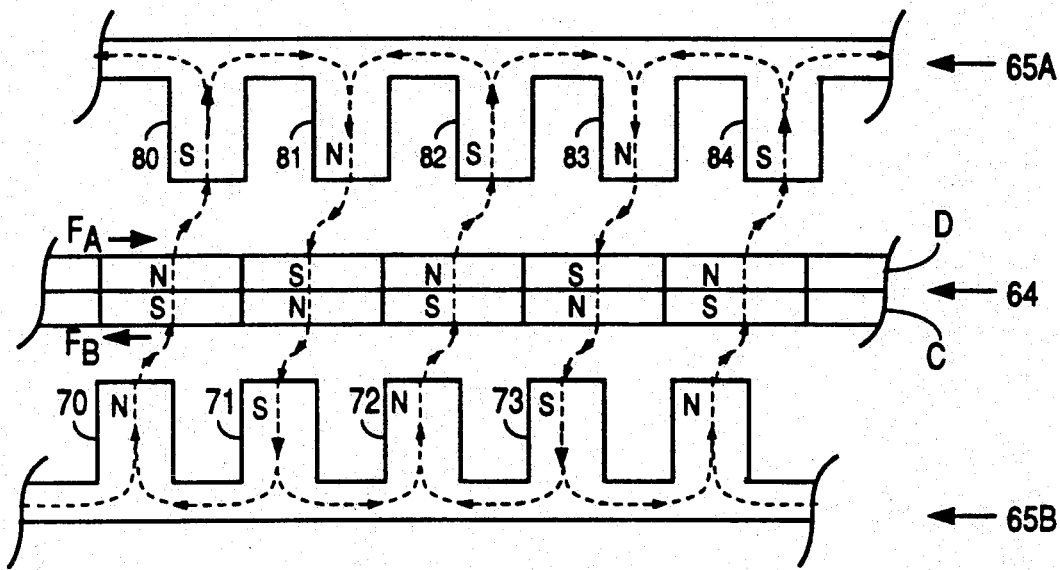
FIG. 15 illustrates schematically a linear section of the composite magnet, the two stator members, and a flux path.

FIG. 14 shows composite magnet 64 and stator members 65A and 65B with four flux loops illustrated schematically. FIG. 15 illustrates a linear section of these same components to further clarify the flux path. Referring to the flux path 140 in FIG. 14, note the magnetic flux pattern is established from north to south poles. For example, the flux path 140 begins at pole piece 72 which exhibits a north face, travels through the south pole on side C and the north pole on side D of composite magnet 64. Thus, when a flux path is established between all pole pieces through composite magnet 64, a "cylinder" of parallel magnet circuits is formed. The path continues to pole pieces 82 on stator member 65A which exhibits a south face. At this point, as seen more clearly in FIG. 15, the path diverges. One half of the flux travels to adjacent pole piece 81 and the other half of the flux travels to pole piece 83, both pieces exhibit north poles. Thus, a flux path in the stator members is in a perpetual state of being halved or doubled.

The magnetic flux travels in the shortest possible path through the air gap established between stator members 65A and 65B and composite magnet 64. As shown in FIG. 15, stator member 65A exhibits a force $F_A$ on composite magnet 64 while stator member 65B exerts an opposite force $F_B$ on the composite magnet. When forces $F_A$ and $F_B$ are equal in magnitude, composite magnet 64 is in equilibrium, i.e. in its detent position. Thus, composite magnet 64 will resist movement and attempt to return to its detent position if forces $F_A$ and $F_B$ are unequal.

Figure 16B:
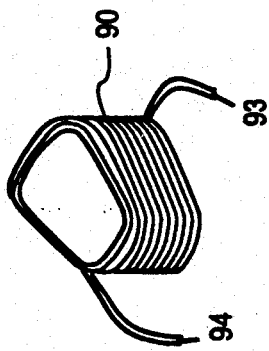
FIG. 16B illustrates a coil which is pre-formed and subsequently bonded to the PC board shown in FIG. 16A.
Figure 16A:
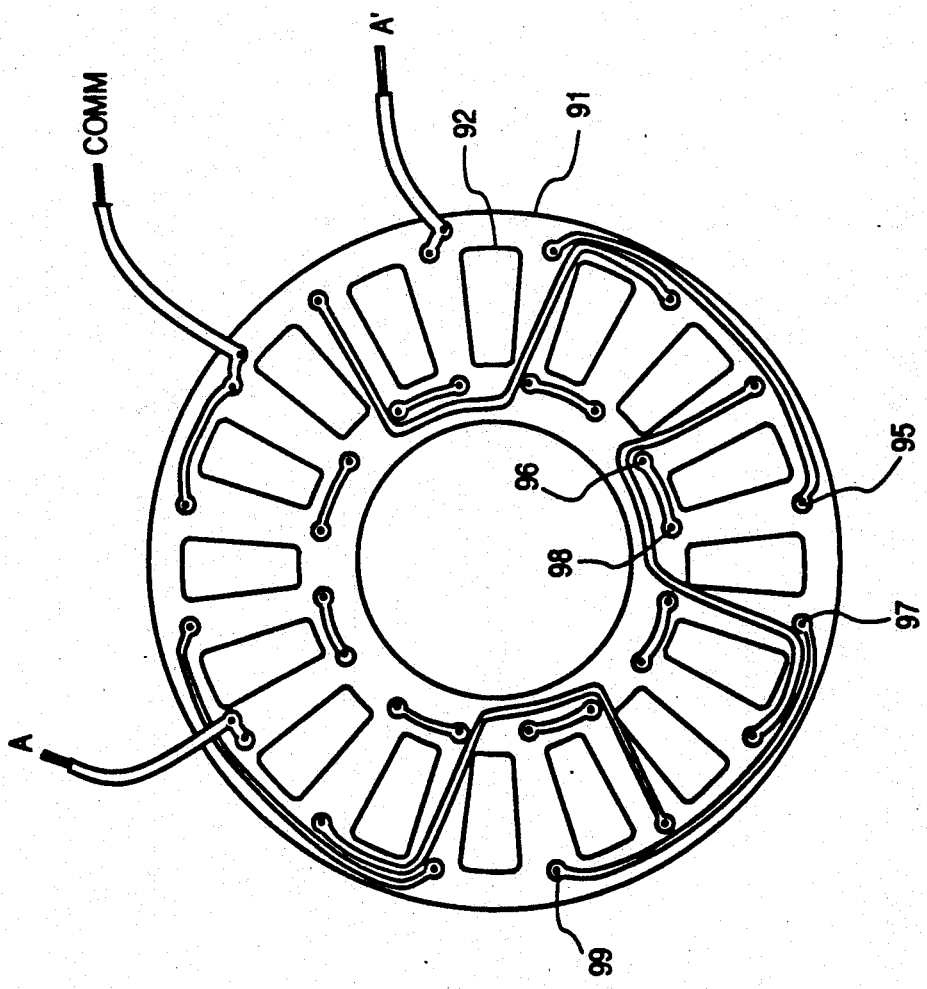
FIG. 16A shows a PC board which is adhesively coupled to a stator plate in one embodiment of the present invention.

In another embodiment of the present invention, the interconnection of individual coils on stator member 65 (FIG. 6) are formed using standard PC board assembly processes. Referring to FIGS. 16A and 16B, a pole piece coil 90 is pre-wound to conform to any pole piece 67 (FIG. 7). Coil 90 is then bonded, i.e. exposed to a current which heats coil 90 above the thermal limits of its insulation, thereby causing coil 90 to form a solid component. Coil 90 is then adhesively connected to PC board 91 surrounding each hole 92. PC board 91 comprises standard PC board material, typically epoxy glass, which is 0.03 inches (0.076 cm) thick. Copper traces are formed on PC board 91 to provide inner connection between coils 90. For example, as seen in FIG. 16B, coil 90 has ends 93 and 94 which are connected to trace ends 95 and 96, respectively. Connection is done typically by wave soldering. Similarly another coil 90 is connected to trace leads 97 and 98. Thus, current flows from trace end 95 through coil 90 from ends 96 to end 98 through another coil 90 to trace end 97. Note trace end 97 skips two pole pieces and ends at trace end 99. This connection achieves the electrical configuration shown in FIGS. 9A and 9B. After all coils 90 are bonded to the traces by wave soldering, PC board 91 is connected to stator member 65. This connection is commonly done with adhesive. In this manner, manufacturing and assembly costs for stator members 65 are significantly reduced.

While the invention has been described with respect to certain embodiments, the scope of the present invention is defined by the appended claims and is not necessarily limited to the embodiments described herein, which are merely illustrative. For example, the number of composite magnets and stator members may vary depending on the application. In one application, one two-sided stator member is placed in operative relation to two composite magnets which are then placed in operative relative to two one-sided stator members. This application would provide at least double the torque capability. Additionally, any number of phases may be present on an individual stator member. Moreover, dimensions for all components are illustrative only and vary depending on the application. Accordingly, other embodiments and variations not described herein may be within the scope of the invention, as defined by the appended claims.

I claim:

1. A stepper motor comprising:
a multi-pole composite magnet having a first and a second section, each section having a plurality of apertures and a plurality of protrusions, wherein said apertures of said first section mate with said protrusions of said second section and said apertures of said second section mate with said protrusions of said first section, wherein said first and said second sections are magnetized in opposite axial directions;
at least one stator member placed in operative relation to said multi-pole composite magnet; and
means for positioning said composite magnet and said at least one stator member on a common axis.

2. The stepper motor of claim 1 wherein said plurality of protrusions have a height equal to a depth of said plurality of apertures.

3. The stepper motor of claim 2 wherein each of said at least one stator member comprises a plurality of pole pieces.

4. The stepper motor of claim 3 wherein each of said plurality of pole pieces has an associated coil, wherein current through said coil determines the magnetic polarity of said pole piece.

5. The stepper motor of claim 4 wherein a plurality of said coils form at least one phase on said at least one stator member.

6. The stepper motor of claim 5 wherein said at least one phase determines the angular movement of said multi-pole composite magnet.

7. The stepper motor of claim 3 wherein said means for positioning comprises a shaft.

8. The stepper motor of claim 7 wherein said means for positioning further comprises a housing.

9. The stepper motor of claim 8 further comprising means for preventing an axial wobble of said multi-pole composite magnet.

10. The stepper motor of claim 9 wherein said means for preventing comprises at least one spacer coupled to said shaft, said at least one spacer having a surface flush to a surface of said multi-pole composite magnet.

11. The stepper motor of claim 10 wherein said shaft prevents angular slippage of said multi-pole composite magnet.

* * * * *